United States Patent
Rein

(10) Patent No.: US 6,681,655 B2
(45) Date of Patent: Jan. 27, 2004

(54) GRINDING ATTACHMENT AND SAW-BLADE GRINDING MACHINE WITH AN HF SPINDLE

(75) Inventor: Harry Rein, Locust Grove, VA (US)

(73) Assignee: Walter AG, Tubingen (DE)

(*) Notice: Subject to any disclaimer, the term of this patent is extended or adjusted under 35 U.S.C. 154(b) by 36 days.

(21) Appl. No.: 09/792,060

(22) Filed: Feb. 26, 2001

(65) Prior Publication Data

US 2001/0027703 A1 Oct. 11, 2001

(30) Foreign Application Priority Data

Feb. 25, 2000 (DE) .......................................... 100 09 075

(51) Int. Cl.[7] .............................................. B23D 63/14
(52) U.S. Cl. ................................................ 76/48; 76/43
(58) Field of Search ........................... 76/47.1, 48, 43; 451/5, 8, 10, 45, 192, 193, 196, 203, 205, 206

(56) References Cited

U.S. PATENT DOCUMENTS

| | | | | |
|---|---|---|---|---|
| 1,844,225 A | * | 2/1932 | Medholdt | 76/48 |
| 3,717,052 A | * | 2/1973 | McKinney | 76/48 |
| 4,078,457 A | | 3/1978 | Schultz | |
| 5,319,885 A | * | 6/1994 | Meck et al. | 76/48 |
| 6,332,375 B1 | * | 12/2001 | Randl et al. | 76/43 |

FOREIGN PATENT DOCUMENTS

| | | |
|---|---|---|
| CH | 268248 A | 5/1950 |
| DE | 31 33 488 A1 | 3/1983 |
| DE | 40 15 554 A1 | 11/1991 |
| DE | 198 04 762 A1 | 7/1999 |
| FR | 2 465 547 A | 3/1981 |
| WO | WO 93/00194 | 6/1992 |
| WO | WO 93/00194 A1 | 1/1993 |

* cited by examiner

*Primary Examiner*—Hwei-Siu Payer
(74) *Attorney, Agent, or Firm*—Venable LLP; Norman N. Kunitz

(57) ABSTRACT

A grinding machine, preferably for sharpening circular saw-blades, has a machine frame that supports a device for supporting the saw blade, for fixedly clamping the blade, and for advancing the saw-blade tooth-by-tooth. The grinding attachment has two independent operating spindles or, which are preferably oriented perpendicular to one another, and support separate drives. The grinding attachment is mounted to pivot and be adjusted in three spatial directions. In a selected pivoting position, one of these spatial directions (Z direction) is oriented radially with respect to the saw blade. In this position, the axis of rotation of one spindle is oriented in the circumferential direction, and the axis of rotation of the other spindle is oriented in the radial direction. A grinding attachment of this type permits the hollow-grinding of tooth faces with grinding pencils that have a small diameter. A separate, high-speed motor serves to drive the grinding pencil.

22 Claims, 7 Drawing Sheets

GRINDING ATTACHMENT AND SAW-BLADE GRINDING MACHINE WITH AN HF SPINDLE

CROSS-REFERENCE TO RELATED APPLICATION

This application claims the priority of German Application No. 100 09 075.3, filed Feb. 25, 2000, which is incorporated herein by reference.

BACKGROUND OF THE INVENTION

The invention relates to a grinding attachment and a saw-blade grinding machine using the attachment, particularly for circular saw blades whose teeth have a hollow face.

Saw-blade grinding machines, which must be used in maintenance work for sharpening used saw blades, or in production, must be adaptable to the existing saw-blade conditions, or the tooth shape to be created. Usually, the tooth back and tooth face of a tooth of a saw blade, particularly in saw blades with hard-metal faces, must be ground. Tooth profiles may also be ground. The grinding shapes can vary. In some cases, it may be desirable to grind the tooth face to be hollow, while in other cases surface grinding is desired.

To produce a hollow grind on a tooth face, German published Patent Application No. DE 41 41 900 A1 discloses a hollow-face grinding method that operates with a cylindrical grinding body whose axis of rotation is oriented essentially parallel to the surface of the tooth face. The grinding body is a component of a grinding pencil or spindle that is brought into engagement with the tooth face in the center plane, or into two engaged positions that are offset relative to the center plane of the saw blade for grinding the tooth face. The direction of rotation is selected according to the direction of the offset.

Hollow-grinding the tooth face is necessary in some saw blades, but not all types. The saw-blade grinding machine is intended to be flexible in its use, without requiring retooling or modifications.

SUMMARY OF THE INVENTION

It is therefore the object of the invention to improve a saw-blade grinding machine to permit the machining of the widest-possible variety of saw blade types.

The above object generally is achieved according to the present invention by a grinding attachment for a grinding machine that comprises: a bearing support; a first shaft mounted on the bearing support for rotation about a first axis, with the first shaft being drive-connected to a driving device, and having at least one grinding wheel mounted on one end thereof; a second shaft mounted on the bearing support of the grinding attachment for rotation about a second axis, with the second shaft being drive-connected to the driving device for operation at a higher rpm than that of the first shaft and having at least one grinding tool mounted on one end thereof; and the second shaft is disposed in a region between the ends of the first shaft.

The above object generally is further achieved by a saw-blade grinding machine using the above described grinding attachment according to the invention.

The grinding attachment according to the invention has two shafts or spindles, which are connected to drives for different speeds or rpms. Whereas the first shaft or spindle can be provided at both ends with at least one grinding wheel, a grinding pencil or similar tool is disposed on the second shaft or spindle between the ends of the first shaft. The drives of the two shafts are preferably such that the ratio of the rpm or speed of the first shaft to the rpm or speed of the second shaft is similar to the ratio of the circumference of the grinding tool of the second shaft to the circumference of the (larger) grinding wheel of the first shaft. The grinding pencil of the second shaft runs at, for example, 10,000 to 60,000 rpm.

The arrangement of the second shaft in a region between the ends of the first shaft, i.e., preferably outside of a cylindrical or conical region enclosed by the two grinding wheels disposed at the two ends, results in a compact, stable design that only vibrates slightly, and yet permits good positioning. The high-speed grinding tool (e.g., a grinding pencil) can readily engage the tooth face of virtually any saw blade. The spacing of the grinding body of the grinding pencil from the axis of rotation of the first shaft is preferably at least as large as the radius of the larger grinding wheel, with the axes of rotation possibly intersecting or crossing one another. This prevents the grinding wheels from engaging the saw blade when the grinding pencil is supposed to be active. While the grinding wheels are operating, the grinding pencil is spaced from the saw blade. In this design, the positioning paths of the grinding attachments are short, permitting a fast, economical operation.

When the shafts provided on the grinding attachment are held in a fixed spatial arrangement, the resulting design is particularly compact and sturdy. The shafts provided on the grinding attachment are preferably seated on the bearing support such that they cannot be adjusted relative to one another.

The drives of the two shafts are preferably separate, and can therefore be actuated independently of one another. The driving device for the first shaft and the second shaft includes a first and a second drive, which drive the Respective shafts separately. The second drive is preferably a high-speed drive having an rpm (e.g., 60,000 rpm fixed) that is at least ten times higher than the rpm of the first shaft (e.g., 1000–6000 rpm). This permits the use of grinding tools having sharply differing diameters, for example, varying by more than one order of magnitude, on one and the same grinding attachment.

For positioning, it is advantageous for the first and second shafts to be perpendicular to one another, and to intersect one another or be offset from one another. The two shafts preferably extend in a plane that coincides with the center plane of the saw blade, or in a plane parallel to this plane.

In accordance with a further aspect of the invention, the saw-blade grinding machine has a machine stand on which all of the essential components of the saw-blade grinding machine, including the above described grinding attachment, are mounted. The machine stand holds a saw-blade carrier, which, in connection with a clamping apparatus, may be set up for fixedly supporting the saw blade in a machining position for the machining process. A device is also provided for advancing the saw blade tooth-by-tooth, thus transferring the teeth consecutively into the machining position. A separate advancing device, a so-called dividing finger, can be provided for this purpose. As an alternative, the advancing device can also be a component of the saw-blade carrier. It can engage the teeth of the saw blade or other locations of the saw blade, or the saw-blade carrier.

Preferably, an advancing device that can be variably controlled is used, so advancing increments can be set according to need. In a particularly preferred embodiment, the advancing increments are controlled individually for setting or varying the advancing increments on a saw blade.

At least one grinding attachment according to the invention, which has a bearing support, serves in machining the teeth. However, the grinding attachment can be divided and provided with first and second bearing supports, instead of a single bearing support. Each of the at least two shafts of the grinding attachment is provided with at least one dedicated grinding body. Whereas one shaft has one or more grinding wheels, the other has a grinding pencil. The first and second shafts are driven by a driving device, which is preferably divided into two separate drives that are actuated separately, preferably by a superordinate control device that also controls the rest of the grinding machine.

The grinding attachment is preferably embodied such that only one of the grinding bodies or tools engages the saw blade at a time. Accordingly, the drive of one shaft is adequate. The grinding pencil is provided for machining the tooth face. The grinding wheel(s) is (are) primarily provided for machining the tooth back and, if necessary, the tooth face.

Existing grinding attachments, or those correspondingly equipped in advance, can be retrofitted with the high-speed drive for the grinding pencil.

A positioning device supported by the machine stand permits two linear adjusting directions and, optionally, a pivoting movement about a pivoting axis extending perpendicular to the saw blade, and possibly a further pivoting axis. The pivoting permits an adaptation of the orientation of the grinding wheel and the grinding pencil to the tooth back and the tooth face. Additional linear axes permit an advancing movement. In an ideal case, three linear axes, oriented perpendicular to one another, are provided.

A significant advantage of the novel grinding machine is that saw blades whose teeth have a hollow face can be completely ground in one work cycle in a clamped arrangement with one machine. Manual intervention is typically not required, and the positioning paths are short.

The machine stand supports the positioning device for permitting a precise association and positioning relative to the saw blade. Instead of the above-mentioned pivoting axis extending perpendicular to the surface of the saw-blade, the saw blade can also be moved to a different position, in which instance the grinding attachment is not pivoted. This can be effected through an adjustment of the saw-blade carrier on a curved or straight path, to the side of a connecting line between the saw-blade carrier and the grinding attachment. Furthermore, the axis of rotation of the saw blade, in connection with the lateral adjustment of the grinding attachment, can replace the pivoting axis extending perpendicular to the saw-blade surface.

A control device controls the operation of the saw-blade grinding machines, controlling the positioning device and the advancing device, as well as the holding device and the driving device. Thus, the entire grinding process can be performed with control. The preferably flexible control device and the aforementioned arrangement of the other components allow complete machining of the saw blade in a clamped arrangement in one saw-blade grinding machine. The saw-blade grinding machine is also flexible and versatile.

For adaptation to different saw-blade diameters, the saw-blade carrier is preferably adjustably seated on the machine stand for setting the distance from the grinding attachment. As an alternative, the position of the grinding attachment can be adapted to various saw-blade diameters through an adjustment of the grinding attachment. In total, three linear axes are sufficient for setting the position. Moreover, at least one pivoting axis is present for the grinding attachment. If the saw-blade carrier is not fixedly, but rather adjustably, seated on the machine stand, the carrier preferably has an adjusting drive, which, like all of the other drives, is controlled by the control device. This permits a flexible machining of batches of different saw blades.

A clamping device, which is fixedly supported on the machine stand, is preferably provided in front of the grinding attachment as a holding device for supporting the saw blade, The clamping device grasps the saw blade in the vicinity of the tooth to be machined, and can preferably be controlled by the control device.

The grinding wheel disposed on the first shaft is provided, at least at its circumferential surface, with an abrasive material. In addition, its flat sides can be provided with an abrasive grain for machining different surfaces of the saw tooth.

The grinding pencil running with a high rpm and the highest rpm preferably has a cylindrical or conical grinding attachment. In an advantageous embodiment, its radius is larger than the thickness of a tooth of the saw blade when measured in the axial direction. To create a particularly deep, rounded, hollow cone on the tooth face, the diameter can be smaller than the tooth thickness.

Further details about advantageous embodiments of the invention are the subject of the dependent claims, the drawing and the description. The drawings illustrate an embodiment according to the invention.

DETAILED DESCRIPTION OF THE PREFERRED EMBODIMENT

Figure 1:
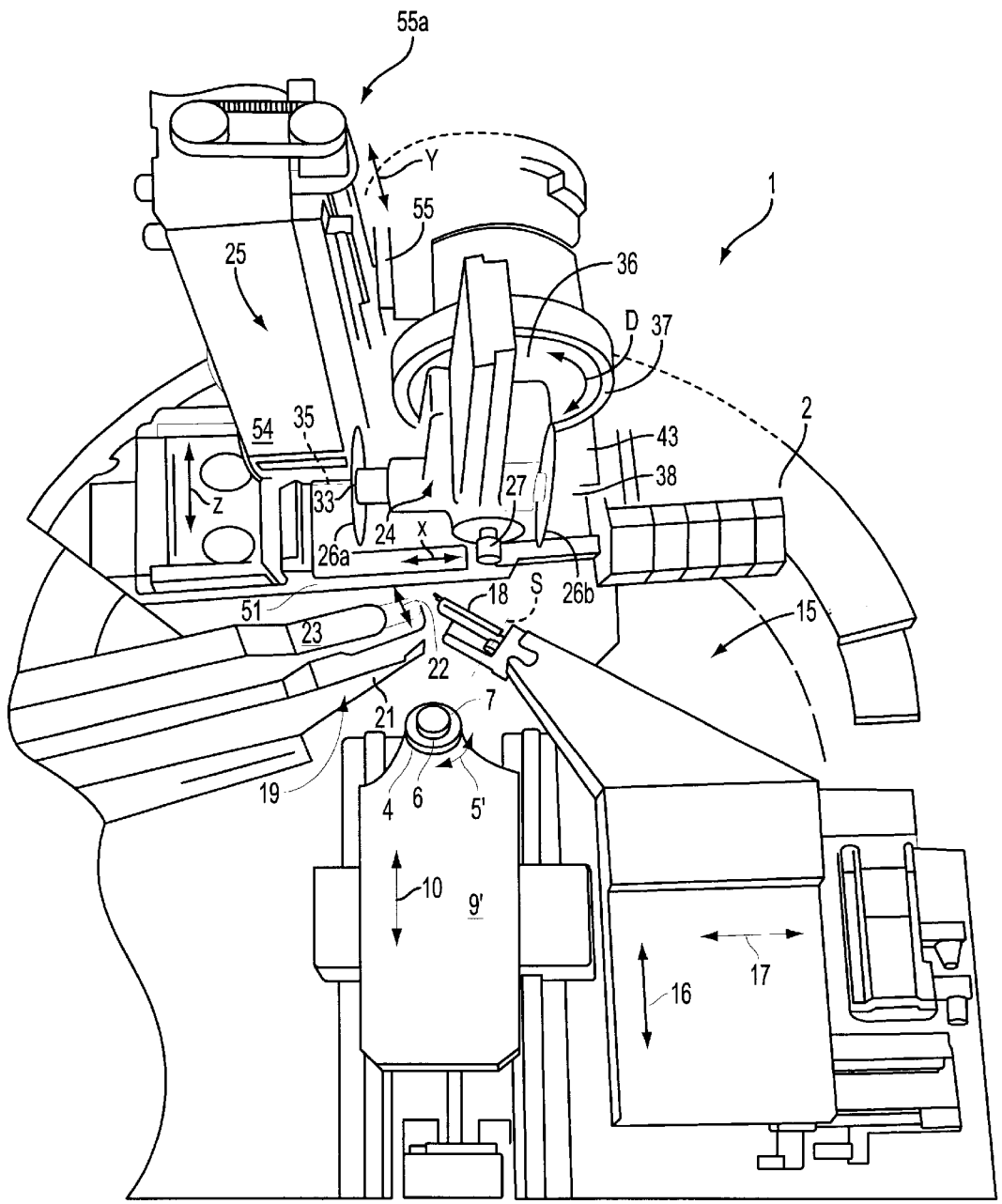
FIG. 1 is a schematic illustration of a saw-blade grinding machine according to the invention in a simplified perspective representation.

Referring now to the drawings, FIG. 1 is a simplified perspective view of a grinding machine 1 serving as a saw-blade grinding machine according to the invention. The grinding machine 1 has a machine stand 2, which is permanently mounted on a mounting surface, not shown. The grinding machine 1 serves in grinding saw blades, particularly circular saw blades 3 as only schematically indicated in FIG. 2. A saw-blade carrier 4, which is mounted to rotate about an axis of rotation 5 in the direction indicated by the arrow 5', serves in supporting the saw blade 3 (See FIG. 2). The saw-blade carrier 4 has a mandrel 6 for receiving and orienting the saw blade 3, with the mandrel 6 projecting from a planar contact surface 7 of the saw-blade carrier 4 and centering the saw blade 3.

A clamping ring 8 (FIG. 2), which cooperates with further clamping devices, not shown, acts as a securing element for securing the saw blade 3 to the saw-blade carrier 4.

Figure 2:
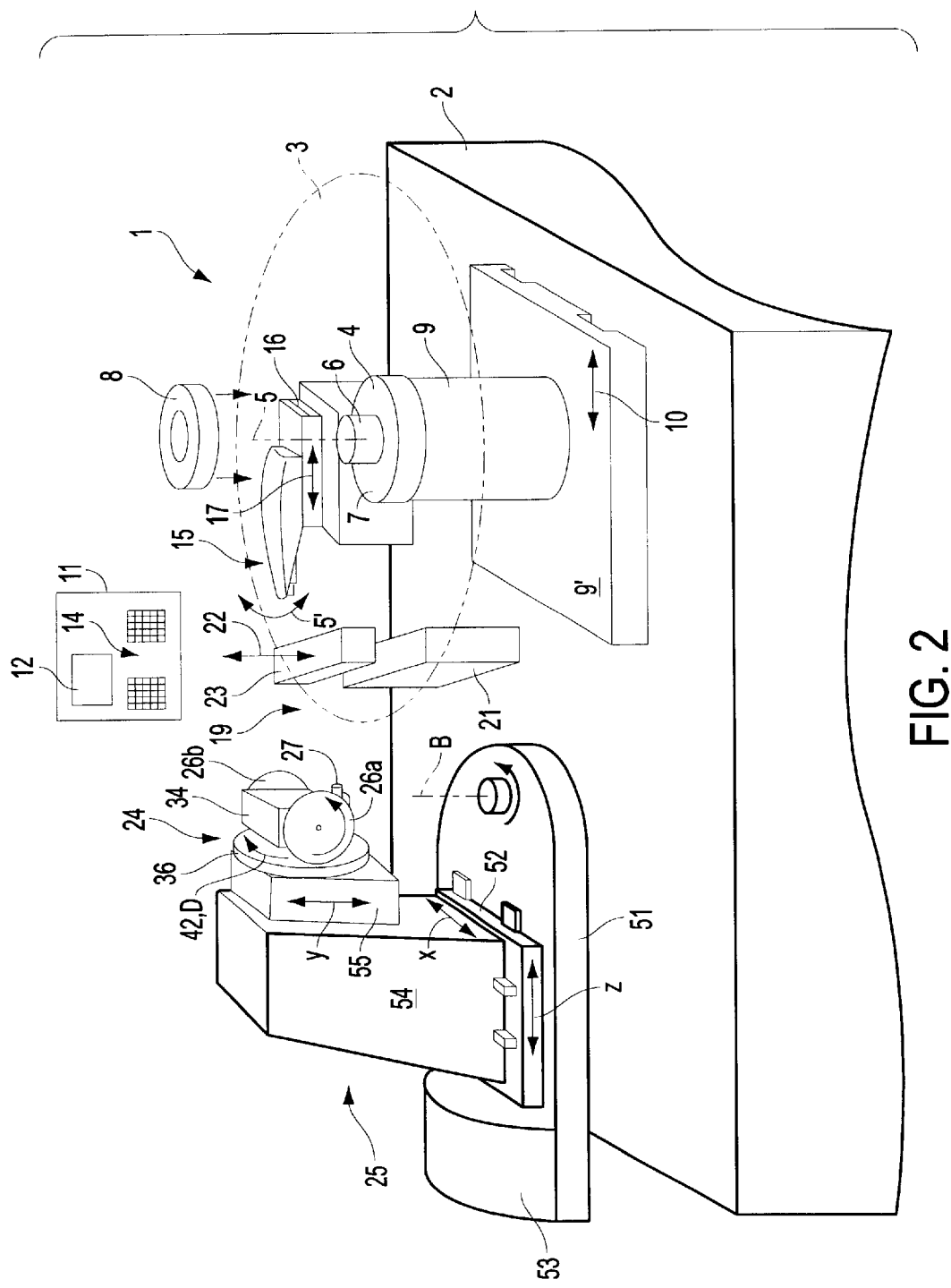
FIG. 2 is a schematic, functional representation of the saw-blade grinding machine according to FIG. 1.
Figure 3:
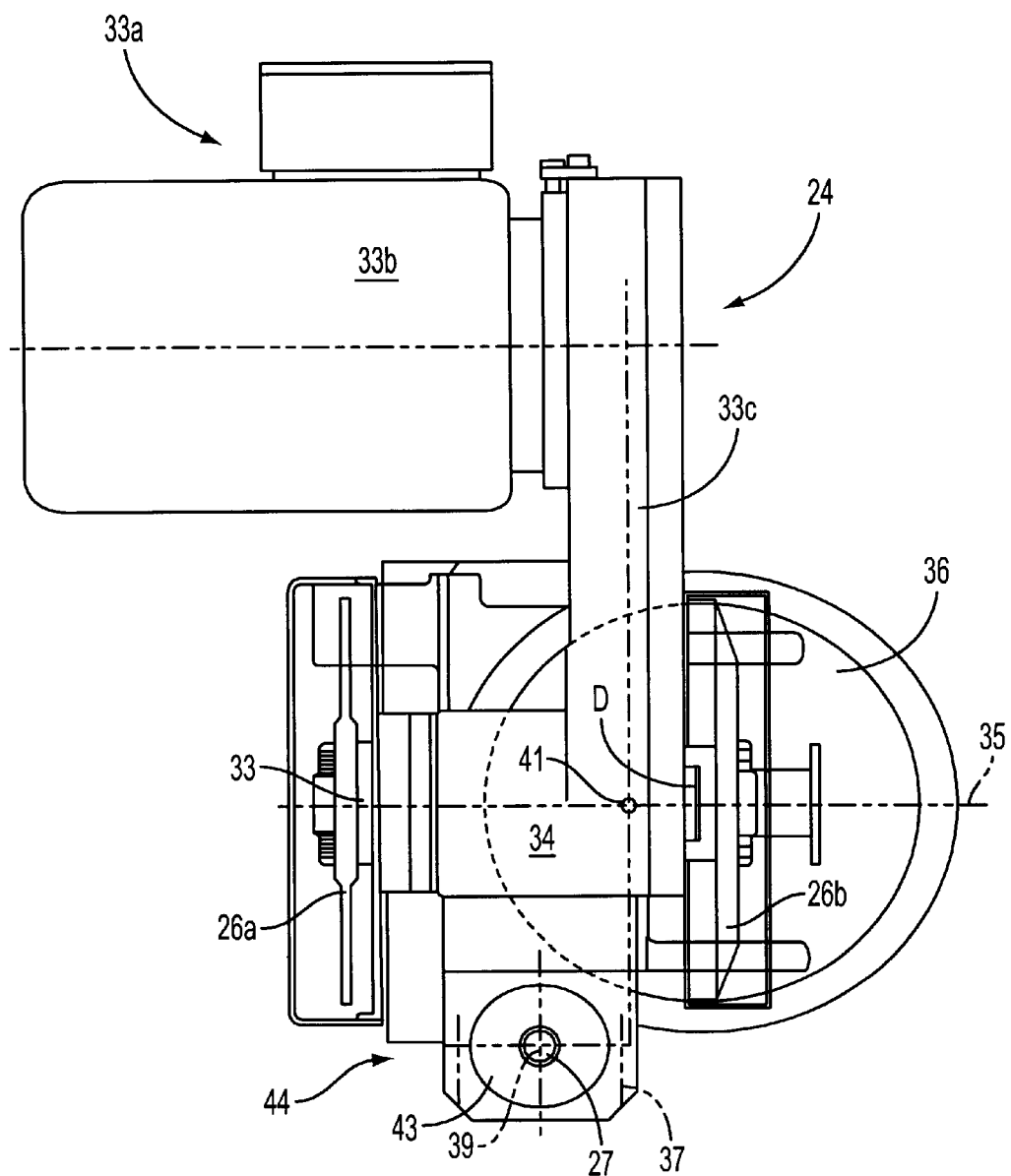
FIG. 3 is a schematic front view of the grinding attachment of the saw-blade grinding machine according to FIG. 1.

The saw-blade carrier 4 is supported by a bearing arrangement 9, on which the saw-blade carrier 4 is mounted to rotate about the axis of rotation 5. The saw-blade carrier 4 with its mounting bearing 9 are in turn mounted on the surface of the machine stand 2 via a plate 9' that is mounted for displacement in the direction indicated by an arrow 10. FIG. 2 does not show the drive for executing the displacement movement. The drive is subordinate to a control device 11 that has a display device 12 and input elements 14.

The control device 11 also controls an advancing device 15, which is mounted on the surface of the machine stand 2. The advancing device serves to rotate the saw blade in increments for transferring a tooth 29 (FIG. 4) into a machining position. The advancing device 15 has a finger 18, which can move in at least one direction, preferably in two directions 16, 17, and can rotate the saw blade 3 tooth-by-tooth about its axis of rotation 5. The finger 18 is also seated to pivot about a pivoting axis S for sliding like a latching pawl over the teeth 29. A drive (controlled by the control device 11) or a spring makes the finger 18 extend into the spaces between the teeth of the saw-blade.

A holding device 19, which is likewise controlled by the control device 11, serves in fixedly supporting the saw blade 3 for machining a respective tooth 29, and is mounted on the surface of the machine stand 2. The holding device 19 includes a stationary lower jaw 21, which is directly mounted on the surface of the upper surface of the machine stand, and an upper jaw 23 that moves approximately parallel to the axis of rotation 5, as indicated by an arrow 22. The jaws 21, 23 can also be replaced by a single jaw that has a controllable magnet, or the like, if needed.

A grinding attachment 24, which is held by a positioning arrangement 25 and is mounted on the surface of the machine stand 2, serves in grinding the saw blade 3. As can be seen from FIGS. 1–6, the grinding attachment 24 has at least one and preferably two grinding wheels 26a, 26b and a grinding pencil 27.

Figure 4:
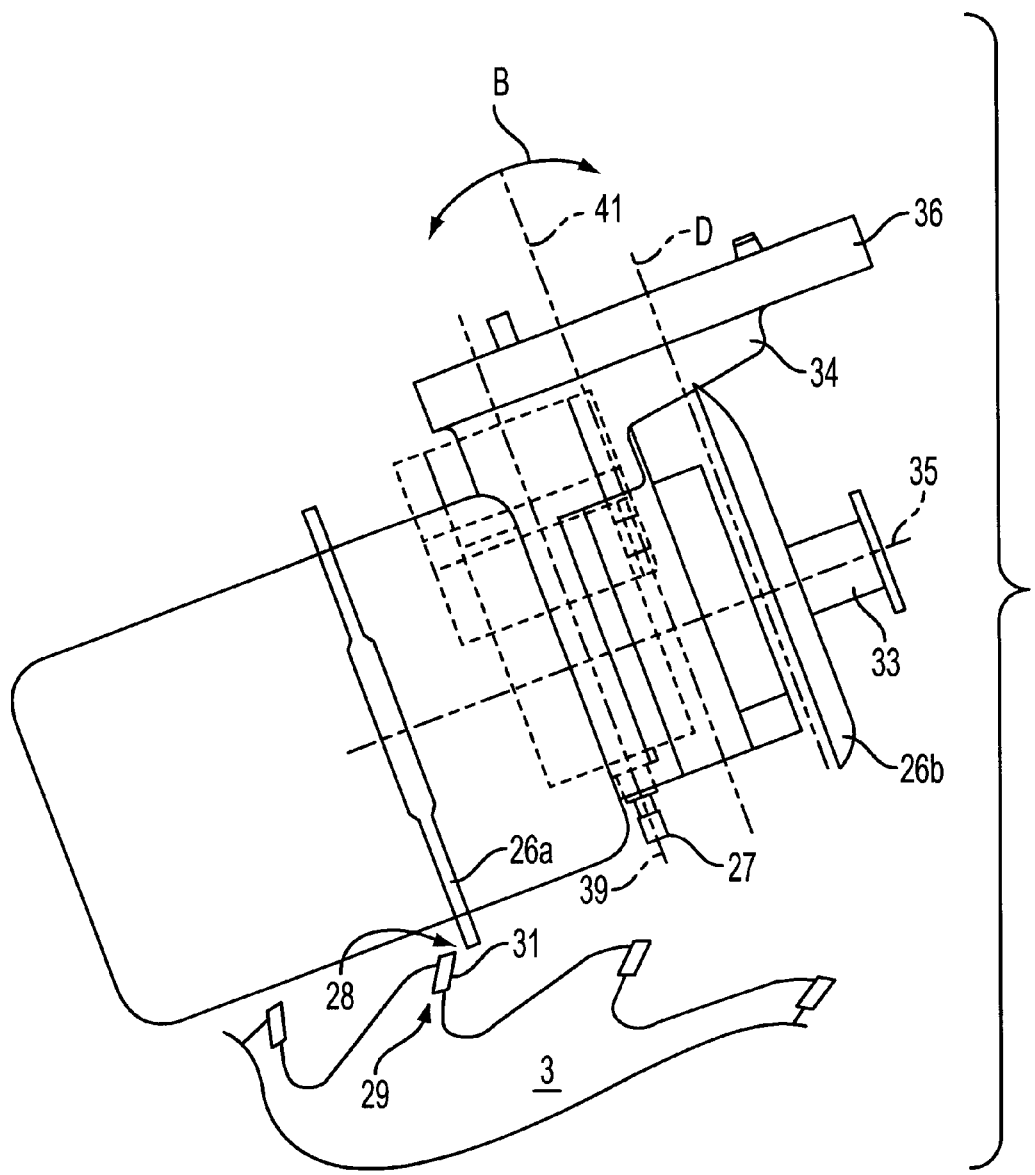
FIG. 4 is a schematic plan view of the grinding attachment according to FIG. 3 during the machining of a saw-blade tooth back.
Figure 5:
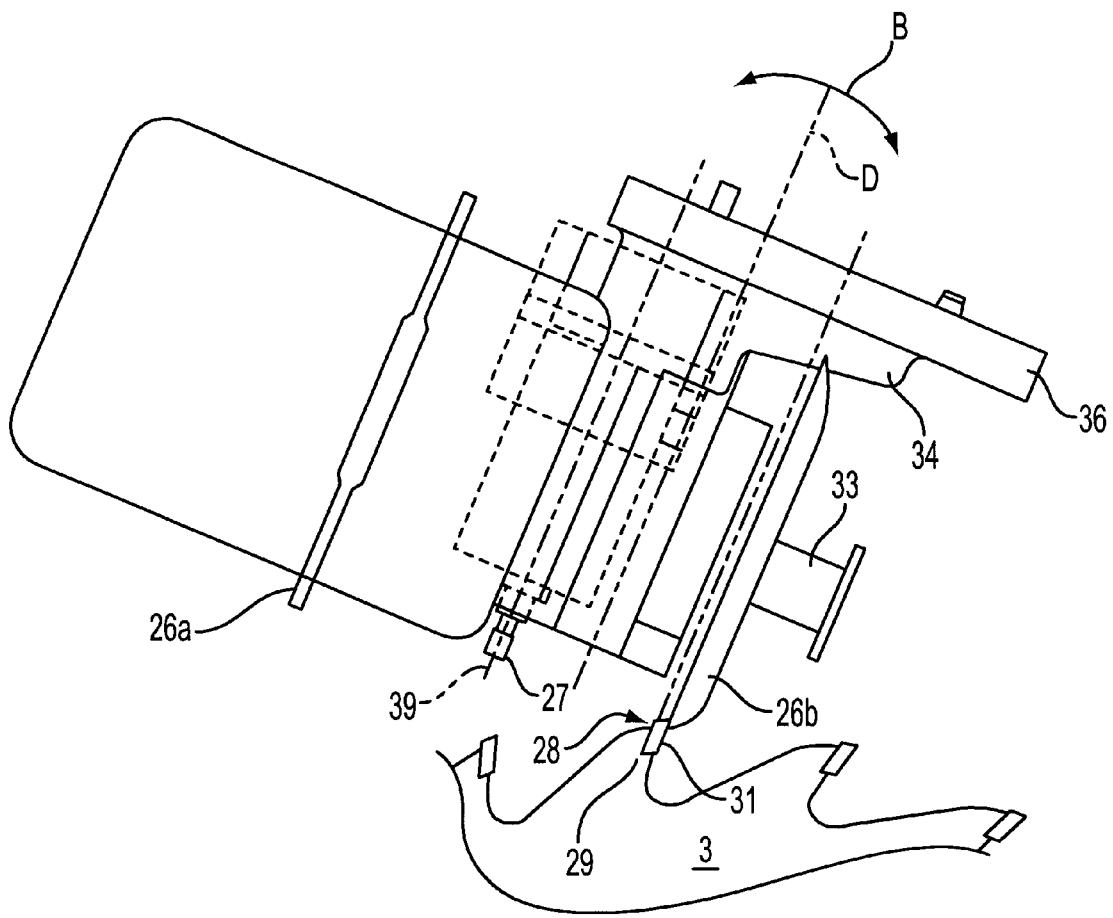
FIG. 5 is a schematic plan view of the grinding attachment according to FIG. 3 during the machining of a tooth face using a side surface of a grinding wheel (surface grinding).
Figure 6:
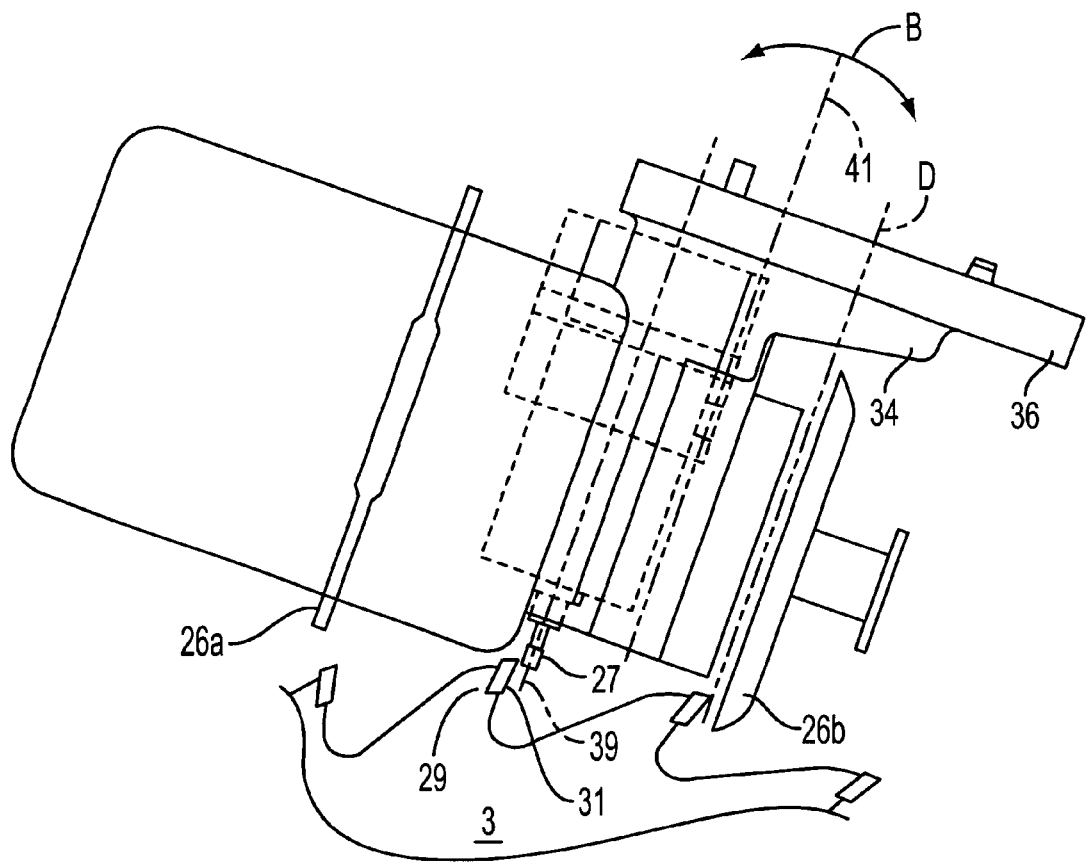
FIG. 6 is a schematic plan view of the grinding attachment according to FIG. 3 during the machining of a tooth face using a grinding pencil (hollow grinding).

As can be seen from FIGS. 4 and 5, the grinding wheels 26a, 26b are provided for respectively grinding a tooth back 28 and a flat (planar) tooth face 31 of a tooth 29 of the saw blade 3, whereas the grinding pencil 27 according to FIG. 6 is provided for further machining of the tooth face 31. The grinding wheels 26a, 26b are supported by a shaft or spindle 33, which is mounted in a bearing support 34 (FIG. 3) so as to rotate about an axis of rotation 35, or, as an alternative, is secured at its respective ends. The bearing support 34 is connected to a base plate 36 mounted on the positioning device 25. In one embodiment, the base plate 36 is mounted so that it can pivot about an axis D (FIGS. 1–4), which is oriented approximately parallel to the center of the saw blade 3, and is therefore approximately parallel to the direction indicated by the arrow 10.

A support 37 (FIG. 3) having a spindle or shaft 38 is secured to the bearing support 34. The spindle or shaft 38 is mounted to rotate about an axis of rotation 39, and supports the grinding pencil 27 at one end. The axes of rotation 35, 39 are preferably oriented perpendicular to one another, and are disposed in respective spaced planes A1, A2 (FIG. 7), which extend parallel to one another and to the saw blade 3. If needed, the base plate 36 can be mounted to pivot (arrow 42 in FIG. 2), about an indicated axis 41 in FIGS. 3 and 4 through 6. The axis of rotation 35 can thus be tilted toward the plane of the saw blade 3, which is, however, not always necessary. The planes A1, A2 are spaced from one another by a distance that approximately corresponds to the sum of the grinding-wheel radius, the grinding-pen radius and the thickness of the saw blade. Furthermore, the grinding pencil 27 is disposed beneath the grinding surface of the surface-grinding wheel 26b (relative to the Y direction), as indicated by a dashed line A3.

The support 37, a spindle motor 43 for the high-frequency spindle 38 and the grinding pencil 27 mounted on the spindle or shaft 38 constitute a grinding module 44, which is preferably permanently installed.

Cooling conduits for a cooling lubricant are provided in the grinding module 44 to cool the spindle motor 43 embodied as a high-power drive. Conduits may also be used to supply a cooling lubricant to the grinding pencil 27.

A driving device 33a, that includes a motor 33b, which is held by the support bearing 37, and a gear arrangement 33c, for example a toothed belt, drives the first shaft 33. The control device 11 controls the drive of the shaft 33 and the drive of the shaft 38. Thus, the two shafts 33, 38 can be driven independently of one another, as needed.

The positioning device 25 has a carrier 51, which is seated to pivot about a pivoting axis B oriented parallel to the axis of rotation 5. The carrier 51 is provided with a linear guide, which guides a sliding member 52 away from the pivoting axis B in the Z direction (FIG. 2), and is linearly adjustable on this axis, or in the X direction (FIG. 1). The carrier 51 likewise supports a corresponding Z drive 53 (X drive).

A further carrier 54 is seated on the sliding member 52 to be displaced in the X direction (Z direction in FIG. 1. This support is therefore adjustable in the circumferential direction of the saw blade 3 (depending on the pivoting position of the carrier 51). The control 11 controls a corresponding adjusting drive, not shown in detail.

A sliding member 55, which supports the base plate 36, is seated on the carrier 54 to be adjusted vertically in the Y direction. An adjusting drive 55a, which is controlled by the control device 11, positions the sliding member 55.

The grinding machine 1 described thus far operates as follows:

For machining the tooth-face surfaces 31 of the saw blade 3, the blade is placed on the saw-blade carrier 4 and clamped with the securing element 8. The advancing device 15 positions the saw blade 3 in a desired first grinding position, as shown in, for example, FIG. 6. The holding device 19 clamps the saw blade 3 in this position, and the grinding attachment 24 is positioned (particularly in the Y direction) such that the grinding pencil 27 is in front of the tooth 29, as shown in FIG. 6. The axis of rotation 39 is oriented parallel to the tooth-face surface 31. The control device 11 controls the drive 43 such that the grinding pencil 27 runs at a high rpm. The grinding wheel 26a and 26b can remain inoperative.

After the axis of rotation 39 has preferably been oriented essentially parallel to the Z axis, the drive 53 is controlled such that the grinding attachment 24 executes a movement in the Z direction, and therefore along the axis of rotation 39 of the grinding pencil 27. This can be effected in the center of the saw blade. If necessary, the Y axis can also be adjusted to achieve an offset from the center plane of the saw blade. The grinding process of the tooth-face surface 31 can be repeated in different Y positions, as needed, for producing a shape of the tooth cutting face that differs from the shape of the jacket surface of the grinding pencil 27. In addition to, or instead of, the actuation of the Y axis, the Y axis can also be actuated for vertically adjusting the grinding pencil 27. A movement that essentially coincides with the circumferential direction of the saw blade 3 can also be executed in the X direction.

Because of the height offset (in the Y direction) between the grinding pencil 27 and the grinding wheels 26a, 26b, preferably by at least one grinding-wheel radius, the grinding wheel 26b is located above the saw blade, so the grinding attachment 24 can be moved and positioned unimpeded without an undesired engagement of the grinding wheels 26a, 26b an d the saw blade 3.

After the face 31 of the tooth 29 has been ground, the grinding attachment 24 is moved slightly outward in the Z direction, and the holding device 19 is opened. The advancing device 15 advances the saw blade 3 by one tooth 29, so that a new tooth to be ground is advanced to the machining or grinding position. Afterward, the holding device 19 again clamps the blade, so the next tooth face 31 can be machined.

Once all of the tooth faces of all of the teeth 29 of the saw blade 3 have been machined, the tooth back surfaces 28 can be machined without it being necessary to change the saw blade 3. For this purpose, the grinding attachment 24 is transferred into the position illustrated in FIG. 4, and lowered in the Y direction. The axis of rotation 35 is oriented essentially parallel to the respective tooth back 28 to be ground. An actuation is now effected in the direction of the X axis, i.e., parallel to the axis of rotation 35 (which is preferably oriented parallel to the X axis), leading to the grinding of the tooth back 28. If this surface is to be planar, a movement can additionally be executed in the Y direction. This can be effected, for example, if the entire tooth back 28 engages the circumferential surface of the grinding wheel 26a.

Once a tooth back 28 has been ground, the control device 11 controls the clamping apparatus 19 and the advancing device 15 for bringing the next tooth into the machining position and clamping it there again. In this way, the tooth backs are all machined consecutively.

Additionally, or alternatively, to hollow-grinding of the tooth face in accordance with FIG. 6, the tooth face can also be surface-ground. Surface grinding can be limited to the outer regions of the tooth face, or be performed on the entire face. FIG. 5 illustrates the grinding process. If surface grinding is not necessary, the grinding wheel 26b can be omitted. As an alternative, the grinding wheel 26a can be omitted, instead of the grinding wheel 26b, if it is not necessary to grind the tooth back.

Figure 7:
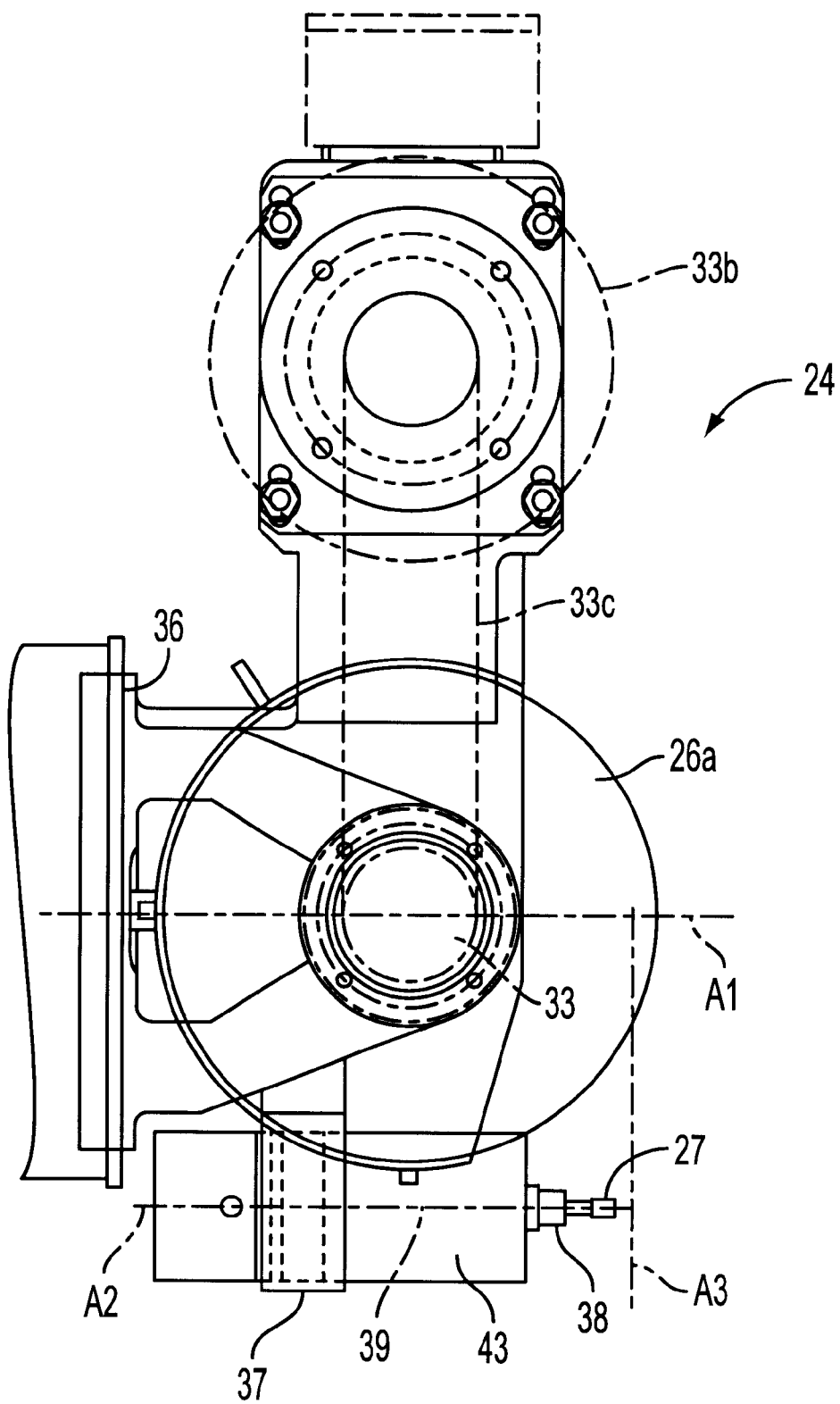
FIG. 7 is a schematic side view of the grinding attachment according to FIG. 3.

The grinding attachment thus has two work planes A1, A2 (FIG. 7), which are offset from one another in a direction perpendicular to the saw blade 3 (Y direction). The offset is preferably slightly greater than one radius of the grinding wheels 26a, 26b. The work plane A1 is associated with the grinding wheels 26a, 26b, while the other work plane A2 is associated with the grinding pencil 27. The spacing or offset between the work planes is preferably equal to the sum of the (largest assumed) radius of the grinding wheels 26a, 26b and the (largest assumed) diameter of the grinding pencil. The spacing is, however, always dimensioned such that the grinding wheels 26a, 26b extend past the saw blade 3 by a sufficient safety distance when the grinding pencil 27 engages the tooth face in its lowest position. FIG. 7 particularly illustrates the spacing between the work planes A1, A2.

If no or little vertical positioning is to be effected, the shafts 33 and 38 can also be disposed at a short distance from one another. The grinding body of the grinding pencil 27, however, is always disposed outside of a volume or region between the grinding wheels, that is limited by the saw blade 3 with the grinding wheel 26 with the largest assumed diameter, if the saw blade is to be brought toward the grinding wheels in the work plane of the grinding pencil, but not touch them. Hence, the grinding pencil 27 can be brought into engagement with the saw blade without the saw blade engaging the grinding wheels. Nevertheless, a compact (sturdy) construction that permits short adjusting paths is attained.

All of the tooth faces and tooth backs of the saw blade 3 are ground in a clamped setup. Once the grinding is completed, the blade 3 is removed and replaced by the next saw blade to be machined. If the diameter of the new saw-blade differs from the diameter of the preceding machined saw blade 3, the bearing device 9 for the saw-blade carrier 4 is adjusted in the direction of the arrow 10 such that the teeth located in the machining position are again in the region of the holding device 19 and the grinding attachment 24.

In summary, the preferred grinding machine 1 according to the invention, which preferably serves in sharpening saw blades 3, has a machine frame 2 that supports a devices for holding the saw blade in order to clamp the blade fixedly and for advancing the blade tooth-by-tooth. The machine stand 2 also supports a positioning device that guides a grinding attachment 24. The grinding attachment 24 has two spindles or shafts, which operate independently of one another, are preferably oriented perpendicular to one another and preferably are provided with separate drives. The grinding attachment 24 is mounted to pivot and be adjusted in three spatial directions. In a selected pivoting position, one of these spatial directions (Z direction) is oriented radially with respect to the saw blade 3. In this position, the axis of rotation 35 of one spindle or shaft is oriented in the circumferential direction of the saw-blade, and the axis of rotation 39 of the other shaft or spindle is oriented in the radial direction. A grinding attachment of this type permits the hollow grinding of tooth faces with grinding pencils that have a small diameter. A separate, high-speed motor serves in driving the grinding pencil.

The invention now being fully described, it will be apparent to one of ordinary skill in the art that many changes and modifications can be made thereto without departing from the spirit or scope of the invention as set forth herein.

I claim:

1. A grinding attachment for a grinding machine, comprising: a bearing support; a first shaft mounted on the bearing support for rotation about a first axis, with the first shaft being drive-connected to a driving device, and having at least one grinding wheel mounted on one end thereof; a second shaft mounted on the same bearing support of the grinding attachment for rotation about a second axis, with the second shaft being drive-connected to the driving device for operation at a higher rpm than that of the first shaft and having at least one grinding tool mounted on one end thereof; and the second shaft is disposed in a region between the ends of the first shaft.

2. The grinding attachment according to claim 1, wherein the first and second shafts mounted on the grinding attachment are held in a fixed spatial relationship to one another.

3. The grinding attachment according to claim 1, wherein the first and second shafts mounted on the grinding attachment are mounted on the same bearing support to be non-adjustable relative to one another.

4. The grinding attachment according to claim 1, wherein the driving device for the first shaft and for the second shaft includes a first drive and a second drive connected to the first shaft and the second shaft, respectively, to drive the first and second shafts separately; and the second drive is a high-speed drive that provides an rpm to the second shaft that is at least ten times higher than the rpm provided to the first shaft by the first drive.

5. The grinding attachment according to claim 1, wherein the first shaft and the second shaft are oriented perpendicular to one another, and are one of intersecting and are offset from one another.

6. The grinding attachment according to claim 5, wherein the first shaft and the second shaft are offset from one another, with the offset being greater than the sum of the radius of the largest grinding wheel on the first shaft and the radius of the grinding tool on the second shaft.

7. The grinding attachment according to claim 1, wherein the first shaft has at least one grinding wheel mounted at each of its ends, and the second shaft is disposed, with its drive, outside of a region formed between the grinding wheels at the respective ends of the first shaft.

8. The grinding attachment according to claim 1, wherein said at least one grinding wheel mounted on the first shaft has an abrasive material at least on its circumferential surface.

9. The grinding attachment according to claim 1, wherein said at least one grinding wheel mounted on the first shaft has at least one flat side surface provided with an abrasive material.

10. The grinding attachment according to claim 1, wherein said at least one grinding wheel on the first shaft is configured for machining the tooth back of a saw blade.

11. The grinding attachment according to claim 1, wherein the grinding tool on the second shaft is configured for hollow grinding a tooth face of a saw blade.

12. The grinding attachment according to claim 1, wherein the grinding tool on the second shaft is one of a conical and a cylindrical grinding pencil, with one-half of a radius of the grinding tool being smaller than a thickness of a tooth of a saw blade when measured in the axial direction.

13. A saw-blade grinding machine for circular saw blades having a grinding attachment according to claim 1.

14. A saw-blade grinding machine comprising:
a grinding attachment including a bearing support, a first shaft mounted on the bearing support for rotation about a first axis, with the first shaft being drive-connected to a driving device, and having at least one grinding wheel mounted on one end thereof, a second shaft mounted on the bearing support of the grinding attachment for rotation about a second axis, with the second shaft being drive-connected to the driving device for operation at a higher rpm than that of the first shaft and having at least one grinding tool mounted on one end thereof, and with the second shaft being disposed in a region between the ends of the first shaft;
a machine stand that is designed to be set up on a mounting surface;
a saw-blade carrier that is mounted on a surface of the machine stand for rotation about an axis transverse to surface of the machine stand, and has a mandrel for receiving and orienting a saw blade in a defined orientation of the saw blade and a securing element to secure the saw blade on the mandrel of the carrier;
an advancing device that is mounted on the surface of the machine stand and advances a saw-blade mounted on the carrier tooth-by-tooth into a machining position;
a holding device that is mounted on the surface of the machine stand and supports and fixedly holds the saw blade when a desired tooth is in the machining position;
a positioning device that is mounted on the surface of the machine stand for movement in at least two linear adjusting directions and on which the grinding attachment is mounted; and
a control device that controls the positioning device the advancing device, the holding device, and the driving device.

15. The saw-blade grinding machine according to claim 14, wherein the saw-blade carrier is mounted on the surface of the machine stand for adjustment in a direction transverse to its axis of rotation.

16. The saw-blade grinding machine according to claim 15, wherein the adjustment direction of the saw-blade carrier is toward and away from the grinding attachment.

17. The saw-blade grinding machine according to claim 15, further comprising an adjusting drive that is controlled by the control device to adjust the position of the saw-blade carrier.

18. The saw-blade grinding machine according to claim 14, wherein the control device controls the holding device to switch it between an active state and a passive state, with a saw blade secured on the saw-blade carrier being fixedly and non-rotatably seated in the active state, and being released and thus can rotate in the passive state.

19. The saw-blade grinding machine according to claim 18, wherein the holding device includes a clamping device with one movable clamping jaw, and one clamping jaw that is fixedly mounted on the surface of the machine stand.

20. The saw-blade grinding machine according to claim 14, wherein the positioning device is mounted for movement in three linear adjustment directions (X, Y, Z) that are oriented perpendicular to one another.

21. The saw-blade grinding machine according to claim 14, wherein the grinding attachment is mounted on the positioning device for pivotal movement about a pivoting axis (B) that is oriented parallel to an axis of rotation of the saw-blade carrier.

22. The saw-blade grinding machine according to claim 14, wherein the saw-blade carrier is mounted on the surface of the machine stand for movement transverse to an imaginary connecting line between the grinding attachment and the axis of rotation of the saw-blade carrier to effect a relative pivoting between the grinding attachment and a tooth of a saw-blade secured on the saw-blade carrier.

* * * * *